United States Patent [19]

Shimizu et al.

[11] Patent Number: 4,961,029
[45] Date of Patent: Oct. 2, 1990

[54] DISCHARGE LAMP LIGHTING DEVICE

[75] Inventors: Keiichi Shimizu; Kenichi Inui; Nanjou Aoike, all of Yokohama, Japan

[73] Assignee: Toshiba Electric Equipment Corporation, Tokyo, Japan

[21] Appl. No.: 327,134

[22] Filed: Mar. 22, 1989

[30] Foreign Application Priority Data

Mar. 31, 1988 [JP] Japan ................... 63-79962
May 17, 1988 [JP] Japan ................. 63-119941

[51] Int. Cl.$^5$ ............................ H05B 41/24
[52] U.S. Cl. .................... 315/219; 315/224; 315/DIG. 7; 315/245
[58] Field of Search ............ 315/219, 224, DIG. 7, 315/245

[56] References Cited

U.S. PATENT DOCUMENTS

| 3,263,125 | 7/1966 | Grenuit | 315/219 |
| 3,467,887 | 9/1969 | Skirvin | 315/219 X |
| 3,691,450 | 9/1972 | Cox | 315/219 X |
| 3,749,976 | 7/1973 | Colyn | 315/219 X |
| 3,922,582 | 11/1975 | Pitel | 315/219 X |
| 4,127,797 | 11/1978 | Perper | 315/DIG. 7 X |
| 4,392,087 | 7/1983 | Zansky | 315/219 |
| 4,513,226 | 4/1985 | Josephson | 315/219 |
| 4,587,461 | 3/1986 | Hamlet | 315/DIG. 7 X |
| 4,734,624 | 3/1988 | Nagase et al. | 315/DIG. 7 X |
| 4,912,374 | 3/1990 | Nagase et al. | 315/DIG. 7 X |

FOREIGN PATENT DOCUMENTS 55-34639 8/1980 Japan .
61-2299 1/1986 Japan .

*Primary Examiner*—Eugene R. Laroche
*Assistant Examiner*—Do Hyun Yoo
*Attorney, Agent, or Firm*—Cushman, Darby & Cushman

[57] ABSTRACT

A discharge-lamp lighting device comprises a voltage generating circuit for generating a high-frequency voltage for lighting a discharge lamp, a self-oscillating device provided in the path of lamp current flowing through the discharge lamp for exciting the voltage generating circuit to self-oscillation, a direct current blocking element connected in series with the self-oscillating device for blocking the flow of a direct current in the self-oscillating device, and a bypass element connected in parallel with the direct current blocking element and the self-oscillating device for bypassing the direct current.

4 Claims, 3 Drawing Sheets

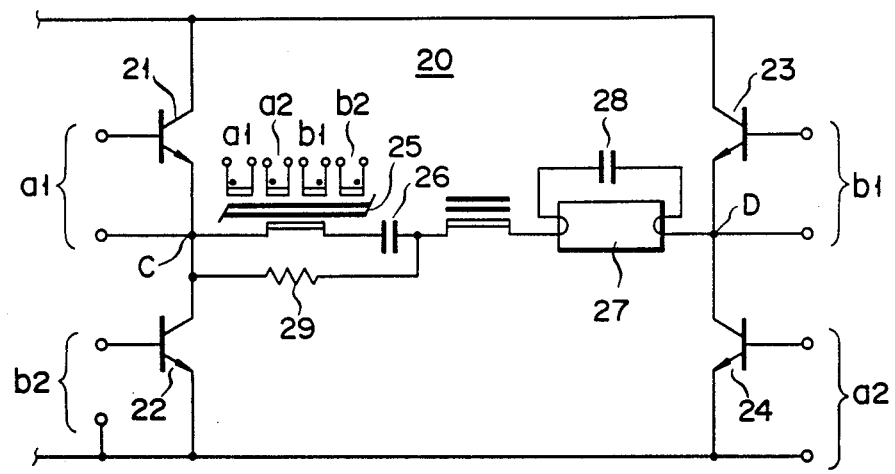
F I G. 2

4,961,029

DISCHARGE LAMP LIGHTING DEVICE

BACKGROUND OF THE INVENTION

1. Field of the Invention

The present invention relates to a discharge-lamp lighting device adapted for high-frequency lighting of an electric discharge lamp by the use of a transistor inverter.

2. Description of the Related Art

Japanese laid-open patent publication No. 61-2299 discloses a transistor inverter for lighting a discharge lamp and a current transformer provided in the current path of the discharge lamp. The current transformer causes self-oscillation of the transistor inverter.

When one electrode of a discharge lamp enters the emitterless state at the end of the life of the lamp, the discharge lamp will be lighted only on one polarity of alternating-current voltage. This phenomenon is called the half-wave discharge. If the half-wave discharge occurs with the conventional discharge-lamp lighting device, the current transformer will be saturated only in one polarity because of direct-current flow therethrough. Then the transistor inverter may cause abnormal oscillation.

Japanese utility model publication No. 55-34639 discloses a discharge-lamp lighting device using a transistor inverter, in which a direct current blocking capacitor is inserted in the path of lamp current flowing through the lamp. The capacitor is required to withstand a peak value of the inverter output voltage. Thus the discharge-lamp lighting device becomes expensive and large. In addition, the capacitor intermittently discharges the stored charge through the lamp and inverter output circuit, so that a transistor or transistors in the inverter is intermittently supplied with a surge voltage. Hence the transistor or transistors of the inverter may possibly be subjected to breakdown.

SUMMARY OF THE INVENTION

It is an object of the present invention to provide a discharge-lamp lighting device which stably sustains the oscillation of a transistor inverter even in the half-wave discharge state of a discharge lamp.

It is another object of the invention to provide a discharge-lamp lighting device which protects an inverter, particularly transistors thereof.

It is still another object of the invention to provide a discharge-lamp lighting device which necessitates no high-voltage withstanding capacitor and is thus not adversely affected by discharge of the capacitor.

According to the invention, a discharge lamp operating apparatus comprises inverter means for inverting a DC voltage to a high frequency voltage, said inverter means including at least one switching element which is controlled on-off stage in response to a high frequency feedback signal, said DC voltage inverted to said high frequency voltage by an on-off conversion of said switching element; a discharge lamp, energized by the high frequency voltage from said inverter means; a current transformer having a primary winding and a secondary winding, said primary winding, through which a lamp current flows, being provided in a circuit which energizes said discharge lamp by means of said inverter means, said feedback signal which controls a high frequency on-off conversion of said switching element of said inverter means being generated in said secondary winding; direct current blocking means, connected in series with said primary winding of said current transformer, for generating a high frequency alternating output as said feedback signal, based on said lamp current and blocking a direct current in said primary winding of said current transformer; and bypath means, connected in parallel with said direct current blocking means and said primary winding of said current transformer, for bypassing the direct current.

In the invention, the series connection of the current transformer winding and the direct-current blocking capacitor may comprise an additional component or components therebetween. The same applies to the parallel connection of the bypass impedance device with the current transformer and the capacitor.

When the discharge lamp is lighted normally, the transistor inverter is excited to self-oscillation by the output of the current transformer. At this point, the direct-current blocking capacitor will not be charged only in one polarity. Since the voltage across the current transformer and the capacitor is relatively low at this point, little current flow is caused in the bypass impedance device.

When the discharge lamp operates on the half-wave discharge basis at the end of its life, a lamp current containing a direct-current component will flow through the lamp current path. However, the direct current component will not be allowed to flow into the current transformer because of the provision of the direct-current blocking capacitor. The direct-current blocking capacitor is charged to increase its terminal voltage. After the capacitor is increased in its terminal voltage to some extent, the lamp current containing a direct-current component will flow in the bypass impedance device. Hence no direct-current component of the lamp current flows in the current transformer so that the oscillation of the inverter can be sustained stably. Furthermore, since the bypass impedance device is connected in parallel with the current transformer and the capacitor in order to prevent the capacitor from being charged up to a high voltage, the capacitor may be low in its withstanding voltage. Moreover, since the capacitor is not charged up to a peak voltage of the output voltage of the transistor inverter, the transistor will not be damaged by a surge voltage resulting from the discharge of the capacitor.

In the invention, the transistor inverter used may be of any type. For example, a single-transistor type or a four-transistor full-bridge type inverter may be used.

As the bypassing impedance device, a resistor, an inductor or a combination thereof may be used.

BRIEF DESCRIPTION OF THE DRAWINGS

Other objects and advantages will be apparent from the following description taken in conjunction with the accompanying drawings in which:

FIG. 2 is a circuit diagram of a discharge-lamp lighting device according to a second embodiment of the present invention;

DETAILED DESCRIPTION OF THE PREFERRED EMBODIMENTS

Figure 1:
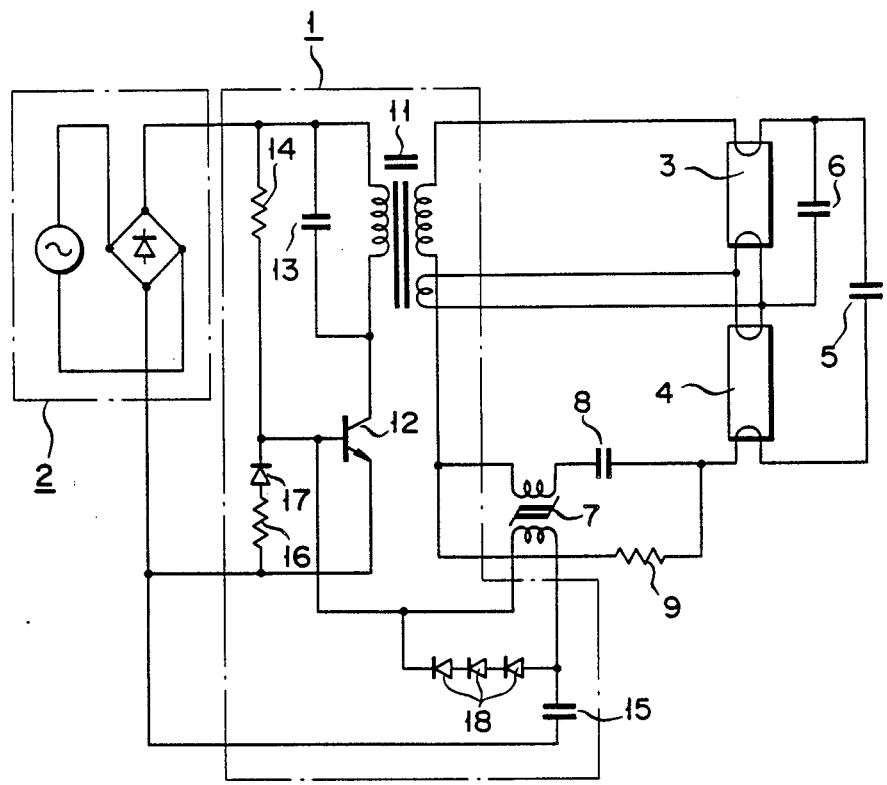
FIG. 1 is a circuit diagram of a discharge-lamp lighting device according to a first embodiment of the present invention.

Referring now to FIG. 1, a transistor inverter 1, which is the so-called single-transistor inverter, mainly comprises a transformer 11, a transistor 12 having its emitter-collector path connected in series with the input winding of transformer 11 and a capacitor 13 for resonance connected in parallel with the input winding of the transformer. Reference numeral 14 denotes a starting resistor, 15 a capacitor forming a positive feedback circuit together with a current transformer 7 described later, 16 and 17, respectively, a resistor and a diode forming a discharge path for capacitor 15, and 18 voltage regulating diodes. The transistor inverter of the present embodiment is arranged to convert an output voltage of a direct-current power source 2, comprised of an alternating-current power source and a rectifier circuit, to a high-frequency alternating voltage of 20–100 KHz, preferably of 40 KHz.

Discharge lamps 3 and 4 each comprised of a fluorescent lamp, for example, are connected serially. Discharge lamps 3 and 4 are lighted by the output of transistor inverter 1. In the present embodiment, a capacitor 5 is connected in parallel with discharge lamps 3 and 4. Capacitor 5 produces resonance with the inductance of transformer 11, chiefly the leakage inductance thereof, before the start of discharge lamps 3 and 4 so as to supply filaments of the discharge lamps with sufficient preheating current. Moreover, capacitor 5 applies high starting voltage to discharge lamps 3 and 4. However, capacitor 5 is not essential to the present invention. A sequence capacitor 6 is connected in parallel with discharge lamp 3.

Reference numeral 7 designates a current transformer of saturable type, for example. The input winding of current transformer 7 is provided in the path of lamp current flowing through discharge lamps 3 and 4. Transistor inverter 1 is excited to self-oscillation by the output of current transformer 7. Current transformer 7 has one end of its output winding connected to the base of transistor 12 and the other end thereof connected to the emitter of transistor 12 via capacitor 15. A capacitor 8, which is connected in series with the input winding of current transformer 7, is provided to prevent the flow of lamp current containing direct-current component in the input winding of current transformer 7. A bypass impedance device 9, for example, a resistor, is connected in parallel with the input winding of current transformer 7 and capacitor 8.

In operation, when transistor inverter 1 is supplied with an output voltage of direct-current power supply 2, transistor 12 of inverter 1 is supplied with base current via starting resistor 14 to be turned on. As a result, tranformer 11 produces an output voltage. Hence transformer 11 and capacitor 5 produces resonance so that resonant current flows in the input winding of current transformer 11. An output current of current transformer 7 is applied to the base of transistor 12. A current flow is caused in the path including the emitter of transistor 12 and capacitor 15 so that transistor 12 is driven. Consequently transistor 12 is rendered conductive more heavily.

When current transformer 7 is saturated where it is of saturable type, when transistor 12 is saturated where current transformer 7 is not of saturable type, or when capacitor 15 is charged fully, transistor 12 is no longer supplied with base current and thus rendered nonconductive. When transistor 12 is turned off, the energy stored in transformer 11 causes transformer 11 to produce resonance in combination with capacitors 13, 5. As a result, resonant current flows through the input winding of transformer 7 in the direction opposite to that before the resonance. At this point, transistor 12 is reverse-biased by the output of current transformer 7, during which capacitor 15 discharges through resistor 16, diode 17 and the output winding of current transformer 7. When the resonance next reverses, transistor 12 is rendered conductive again by the output voltage of current transformer 7. The above operations are repeated thereafter. Accordingly, the filaments of discharge lamps 3 and 4 are preheated by the resonant current and they are lighted at a certain point of time. After discharge lamps 3 and 4 have been lighted, capacitor 15 ceases concern in the resonance or decreases the degree of concern in the resonance. The other operations are the same as above. Discharge lamps 3 and 4 are lighted at a high frequency of tens of kilohertzs.

If either one of discharge lamps 3 and 4 closes its life and thus results in the half-wave discharge, the lamp current will contain a direct-current component. However, no direct-current flow is not caused in the input winding of current transformer 7 because of the provision of direct-current blocking capacitor 8. Therefore, the core of current transformer 7 is not subjected to saturation in single polarity. Thus the on time of transistor 12 is not changed as conventional, thereby sustaining the stable oscillation of the inverter. When capacitor 8 is charged to some extent by the lamp current containing the direct-current component and thus increased in its terminal voltage, the lamp current is bypassed in impedance device 9. Therefore, in this case also, no current containing the direct-current component flows in the input winding of current transformer 7 so that transistor inverter 1 can self-oscillate stably.

The capacitance of direct-current blocking capacitor 8 and the impedance of impedance device 9 may appropriately be determined in accordance with the saturation characteristics of current transformer 7, the capacity of transistor 12 and so on.

Figure 3A:
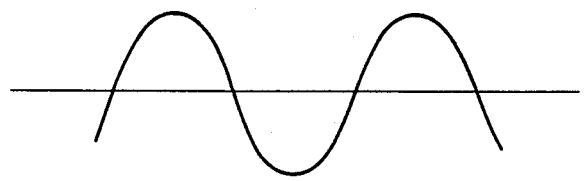
FIG. 3A is a waveform of a current flowing through a current transformer according to the present invention.
Figure 3B:
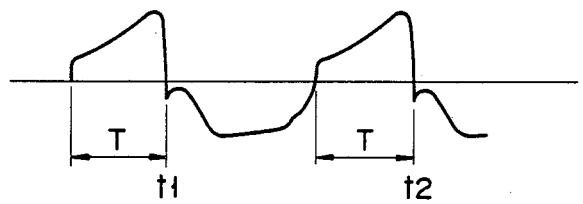
FIG. 3B is a waveform of an output votlage of the current transformer according to the present invention.
Figure 4A:
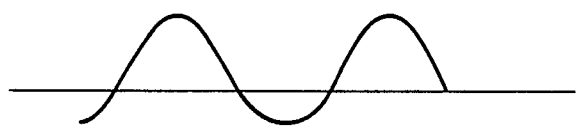
FIGS. 4A and 5A show waveforms of a current flowing through a conventional current transformer.
Figure 4B:
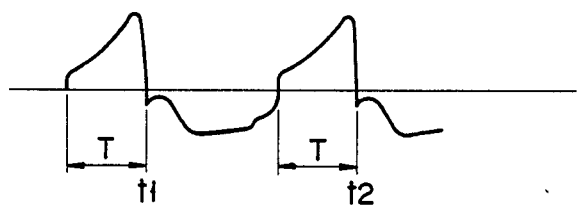
FIGS. 4B and 5B show waveforms of an output voltage of the conventional current transformer.
Figure 5A:
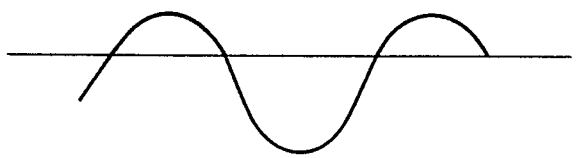
Figure 5B:
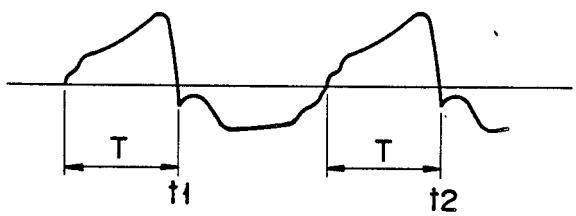

According to the present invention, a current having a waveform as shown in FIG. 3A flows through the current transformer 7 and an output voltage having a waveform as shown in FIG. 3B is output from the current transformer 7, even if the discharge lamp operates in the half-wave discharge. On the other hand, when the discharge lamp operates in one direction of the half-wave discharge in conventional lighting device, a current having a waveform as shown in FIG. 4A flows through the conventional transformer and an output voltage having a waveform as shown in FIG. 4B is output from the conventional current transformer. When the discharge lamp operates in opposite direction of the half-wave discharge in the conventional lighting device, a current waveform as shown in FIG. 5A and an output voltage waveform as shown in FIG. 5B are obtained. In FIGS. 3A to 5B, $t_1$ and $t_2$ show the time at which the current transformer is saturated, and T shows a period during which the transistor 12 is turned on.

Another embodiment of the present invention will be described with reference to FIG. 2. In this embodiment, transistor inverter 20 is the so-called full-bridge type inverter. Four transistors 21 to 24 are bridge-connected. Current transformer 25, direct-current blocking capacitor 26 and discharge lamp 27 are sequentially connected between output terminals C and D of the bridge circuit. A bypass impedance device 29 is connected in parallel with current transformer 25 and direct-current blocking capacitor 26. Transistor inverter 20 of the present embodiment alternates between a first state and a second state in accordance with the output of current transformer 25 so as to produce a high-frequency voltage, the first state being such that transistors 21, 24 are on and transistors 22, 23 are off and the second state being such that transistors 21, 24 are off and transistors 22, 23 are on. Discharge lamp 27 is lighted by the high-frequency voltage.

The other operations of the present embodiment will readily be understood from the above description and the description thereof is omitted. FIG. 2 shows the essential portions only and the other portions will readily be understood and embodied by those skilled in the art.

The present invention need not be limited to the above embodiments and may be subjected to various modifications. For example, the current transformer may be of either saturable type or nonsaturable type. The saturable current transformer is preferable because the discharge-lamp lighting device can be made compact. The discharge lamp may be a high pressure discharge lamp.

According to the present invention, as described above, the transistor inverter is excited to self-oscillation by the output of the current transformer installed in the path of lamp current flowing through the discharge lamp. Since the direct-current blocking capacitor is connected in series with the current transformer and the bypass impedance device is connected in parallel with the current transformer and the capacitor, even if the discharge lamp operates on a half-wave discharge basis, no direct current flow is caused in the current transformer. Hence the saturation of the core of the current transformer in a single polarity can be avoided, which would result from direct current flow in the current transformer. The abnormal oscillation of the transistor inverter can thus be avoided. Particularly, the present invention can avoid the damage of components such as transistors, which might result from excessive input to the transistor inverter. The bypass impedance device prevents the direct current blocking capacitor from being charged up to a peak value of the output voltage of the transistor inverter. Thus a capacitor low in withstanding voltage may be used. Moreover, the transistors can be prevented from being damaged by a surge voltage resulting from discharge of the capacitor.

What is claimed is:

1. A discharge lamp operating apparatus comprising:
    inverter means for inverting a DC voltage to a high frequency voltage, said inverter means including at least one switching element which is controlled on-off stage in response to a high frequency feedback signal, said DC voltage inverted to said high frequency voltage by an on-off conversion of said switching element;
    a discharge lamp, energized by the high frequency voltage from said inverter means;
    a current transformer having a primary winding and a secondary winding, said primary winding, through which a lamp current flows, being provided in a circuit which energizes said discharge lamp by means of said inverter means, said feedback signal which controls a high frequency on-off conversion of said switching element of said inverter means being generated in said secondary winding;
    direct current blocking means, connected in series with said primary winding of said current transformer, for generating a high frequency alternating output, as said feedback signal, based on said lamp current and blocking a direct current in said primary winding of said current transformer; and
    bypath means, connected in parallel with said direct current blocking means and said primary winding of said current transformer, for bypassing the direct current.

2. The device according to claim 1, wherein said voltage inverting means is a transistor inverter.

3. The device according to claim 1, wherein said direct current blocking means is a capacitor.

4. The device according to claim 1, wherein said current transformer is of saturable-type.

* * * * *